United States Patent [19]
Yamamoto et al.

[11] Patent Number: 5,499,842
[45] Date of Patent: Mar. 19, 1996

[54] PAD FOR AIR BAG DEVICE

[75] Inventors: Tadashi Yamamoto; Katsumi Sakakida; Takanobu Ikeda; Chisato Masuya, all of Aichi, Japan

[73] Assignee: Toyoda Gosei Co., Ltd., Japan

[21] Appl. No.: 390,923

[22] Filed: Feb. 16, 1995

[30] Foreign Application Priority Data

Feb. 17, 1994 [JP] Japan .................................. 6-020626

[51] Int. Cl.⁶ .................................................. B60R 21/20
[52] U.S. Cl. ........................................ 280/728.3; 280/731
[58] Field of Search ............................. 280/728.3, 728.2, 280/728.1, 731

[56] References Cited

U.S. PATENT DOCUMENTS

| | | | |
|---|---|---|---|
| 4,995,638 | 2/1991 | Shinto et al. | 280/731 |
| 5,056,814 | 10/1991 | Shiraki et al. | 280/728.3 |
| 5,354,095 | 10/1994 | Muller et al. | 280/728.3 |

FOREIGN PATENT DOCUMENTS

| | | |
|---|---|---|
| 181350 | 5/1989 | Japan . |
| 183652 | 6/1989 | Japan . |
| 2171364 | 7/1990 | Japan . |
| 5-139231 | 6/1993 | Japan .................. 280/728.3 |

*Primary Examiner*—Karin L. Tyson
*Attorney, Agent, or Firm*—Cushman Darby & Cushman

[57] ABSTRACT

A pad or cover for an air bag assembly formed of a thermoplastic elastomer and having an outer wall that includes a substantially H-shaped thin-walled breaking seam designed to break when the air bag is actuated. The breaking seam is H-shaped, as viewed in a vertical direction, and the cover includes an ordinary portion outside of the breaking seam. A horizontal seam portion of the substantially H-shaped portion has straight line portions respectively connected to two vertical seam portions lying on both left and right sides of the substantially H-shaped configuration and a curved U-shaped portion that is interposed between the straight line portions. The thickness of the ordinary portion at the outer peripheral side of the U-shaped portion is thicker than the thickness of the ordinary portions in the vicinities of intersections between the vertical seam portions and the straight line portions.

14 Claims, 6 Drawing Sheets

PAD FOR AIR BAG DEVICE

FIELD OF THE INVENTION

The present invention relates to a pad for covering a folded air bag in an air bag device dedicated to automobiles. More particularly, the invention is directed to a pad for an air bag device of the single-layered type made of a thermoplastic elastomer in which no insert is embedded.

BACKGROUND OF THE INVENTION

A conventional pad for an air bag device is disclosed in Japanese Unexamined Patent Publication No. 2-171364. This type is characterized as being comprised of a single-layered structure made of a thermoplastic elastomer having an outer wall covering a folded air bag.

The outer wall of the pad has a portion that is supposed to break at the time the air bag expands (hereinafter referred to as "the breaking portion") and an ordinary portion excluding such breaking portion. The breaking portion is substantially H-shaped, as viewed in a vertical direction, and thin-walled. The ordinary portion has a thickness larger than the thickness of the breaking portion so that the air bag can expand smoothly from the pad upon breakage of the outer wall which breaks like the opening of a pair of French doors.

To arrange a decorative mark or the like in the middle of the outer wall of the pad, straight line portions and a circuitously curved U-shaped portion are provided on a horizontal rod portion of the substantially H-shape in the breaking portion. The straight line portions, that are respectively connected to two vertical rod portions on both left and right sides of the substantially H-shape and the U-shaped portion that is interposed between the straight line portions, are formed in order to prevent scattering of the decorative mark upon breakage of the ceiling wall subsequent to the expansion of the air bag. This is disclosed in Japanese Unexamined Utility Model Publication No. 1-81350.

However, when the U-shaped portion is formed on the horizontal rod .portion in the breaking portion, a single layered type with no embedded insert pad is not likely to break along the U-shaped portion, especially when made of a soft thermoplastic elastomer. This is because breakage of the breaking portion, in association with the expansion of the air bag, tends to proceed in a straight line.

That is, when breakage of the pad starts at the middle of the U-shaped portion, the breakage of the pad proceeds, in some cases, straight toward the vicinities of intersections between the vertical rod portions, on both left and right sides, and the straight line portions from the middle of the U-shaped portion without going along the U-shape.

In this case, as disclosed in Japanese Unexamined Utility Model Publication No. 1-83652, it is conceivable to make the thickness of the ordinary portion, that extends all along the breaking portion, thicker than the rest of the ordinary portion.

However, if the thickness of the ordinary portion that extends all along the breaking portion is thicker than the rest of the ordinary portion, the vicinities of the intersections between the vertical rod portions on both left and right sides of the breaking portion and the straight line portions serve as the corner portions of two French doors that open on hinges while interposing the horizontal rod portion therebetween at the time the air bag expands after the breakage of the breaking portion. Such corner portions, however, are not soft to the touch because they are thicker and will not yield as the thinner walled areas.

SUMMARY OF THE INVENTION

The invention has been made in consideration of the aforementioned circumstances. Accordingly, an object of the invention is to provide a pad or cover for an air bag device which allows the pad to break neatly at the time the air bag expands yet allows the pad to provide a soft touch even if a circuitous U-shaped portion is formed on a horizontal rod portion in a substantially H-shaped thin-walled breaking portion that is supposed to break.

In a first aspect of the invention, there is provided a pad for an air bag device, the pad being of a single-layered structure made of a thermoplastic elastomer with an outer wall for covering a folded air bag.

The outer wall has a substantially H-shaped thin-walled portion designed to break at the time the air bag expands (hereinafter referred to as "the breaking portion") and an ordinary or remaining portion excluding the breaking portion. The breaking portion is H-shaped as viewed in a vertical direction.

The substantially H-shaped breaking portion includes a substantially straight line rod or seam portion respectively connected to two vertical rod or seam portions, respectively positioned on both the left and right sides of the substantially H-shaped outline. The thin walled seam also includes a curved U-shaped portion interposed centrally of the cover or pad and between the straight line portions.

In the outer wall of the pad, the thickness of the ordinary portion along the outer peripheral side of the U-shaped portion is made thicker than the thickness of the ordinary portion in the vicinities of the intersections between the vertical seam portions and the straight line seam portions.

In a second aspect of the invention, there is provided a pad or cover for an air bag device constructed like the aforementioned device where the thickness of the ordinary portion at the outer peripheral side, in the vicinities of intersections between the U-shaped portion and the straight line portions, is made thicker than the thickness of the ordinary portion in the vicinities of the intersections between the vertical seam portions and the straight line seam portions.

In a third aspect of the invention, there is provided a pad for an air bag device according to the first and second aspects of the invention and the pad is made of a thermoplastic elastomer that has a bending elastic modulus of from about 100 to about 4000 kg/cm$^2$.

The pad or cover according to the first aspect of the invention is characterized by having the thickness of the ordinary portion, on the outer peripheral side of the U-shaped portion, thicker than the ordinary portion in the vicinities of the intersections between the vertical seam portions and the straight line seam portions. Therefore, even if breakage of the breaking portion starts at the middle of the U-shaped portion and extends toward the straight line portions on both left and right sides of the horizontal seam portion in association with the expansion of the air bag, such thick-walled ordinary portion serves as a wall for blocking the directions along which breakage occurs. Therefore, the breakage continues smoothly from the middle of the U-shaped portion toward the straight lines on both left and right sides and along the curved profile of the U-shaped portion, thus allowing the breaking portion to break neatly.

Further, the respective corner portions of the two French door type opening sections that open on hinges while interposing the horizontal seam portion therebetween at the time the air bag expands, i.e., the ordinary portion in the vicinities of the intersections between the vertical seam portions and the straight line seams of the breaking portion, are not thick-walled. Therefore, impairment of the soft touch of the pad can be prevented.

So the pad according to the first aspect of the invention not only allows the breaking portion to break neatly at the time the air bag expands, even if the circuitous U-shaped portion is formed on the horizontal seam portion in the substantially H-shaped breaking portion, but also prevents soft touch of the pad from being impaired.

Still further, the pad according to the second aspect of the invention is characterized as having the thickness of the ordinary portion on the outer peripheral side in the vicinities of the intersections between the U-shaped portion and the straight line portions thicker than the thickness of the ordinary portion in the vicinities of the intersections between the vertical seam portions and the straight line seam portions.

As a result of this construction, even if breakage starts at the straight line portions and moves toward the U-shaped portion of the horizontal seam portion in the breaking portion, the thickness of the ordinary portion on the outer peripheral side in the vicinities of the intersections between the U-shaped portion and the straight line portions is made thicker than that of the ordinary portion in the vicinities of the intersections between the vertical seam portions and the straight line seam portions. Therefore, such thick-walled ordinary portion serves as a wall for blocking straight directions along which breakage occurs. Therefore, the breakage continues smoothly from the straight line portions toward the middle of the U-shaped portion, thus allowing the breaking portion to break neatly.

Incidentally, when the breakage starts at the straight line portions and extends toward the U-shaped portion of the horizontal seam portion in the breaking portion, in the case where there is no thick-walled portion on the outer peripheral side in the vicinities of the intersections between the U-shaped portion and the straight line portions, the breakage continues, in some cases, in a straight manner so as to connect the straight line seam portions on both left and right sides to each other without going along the U-shape.

Therefore, the pad according to the second aspect of the invention allows the breaking portion to break neatly, as it is supposed to do, even if the breakage starts at the straight line portions and moves toward the U-shaped portion of the horizontal seam portion in association with the expansion of the air bag.

Moreover, the pad according to the third aspect of the invention is characterized as setting the elastic bending modulus of the thermoplastic elastomer, of which the pad is made, to about 4000 kg/cm$^2$ or less. Therefore, the pad is soft, and satisfactory touch even on the corner portions of the ordinary portion in the vicinities of the intersections between the vertical seam portions on both left and right sides and the straight line seam portions in the breaking portion and proper breakage can be ensured. In addition, the pad according to the third aspect of the invention is also characterized as having an elastic bending modulus of about 100 kg/cm$^2$ or more. Accordingly, such a tensile strength prevents breakage at portions other than the breaking portion, which in turn contributes to making the pad suitable for covering an air bag of the air bag device M.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENT

An embodiment of the invention will now be described with reference to the drawings.

Figure 5:
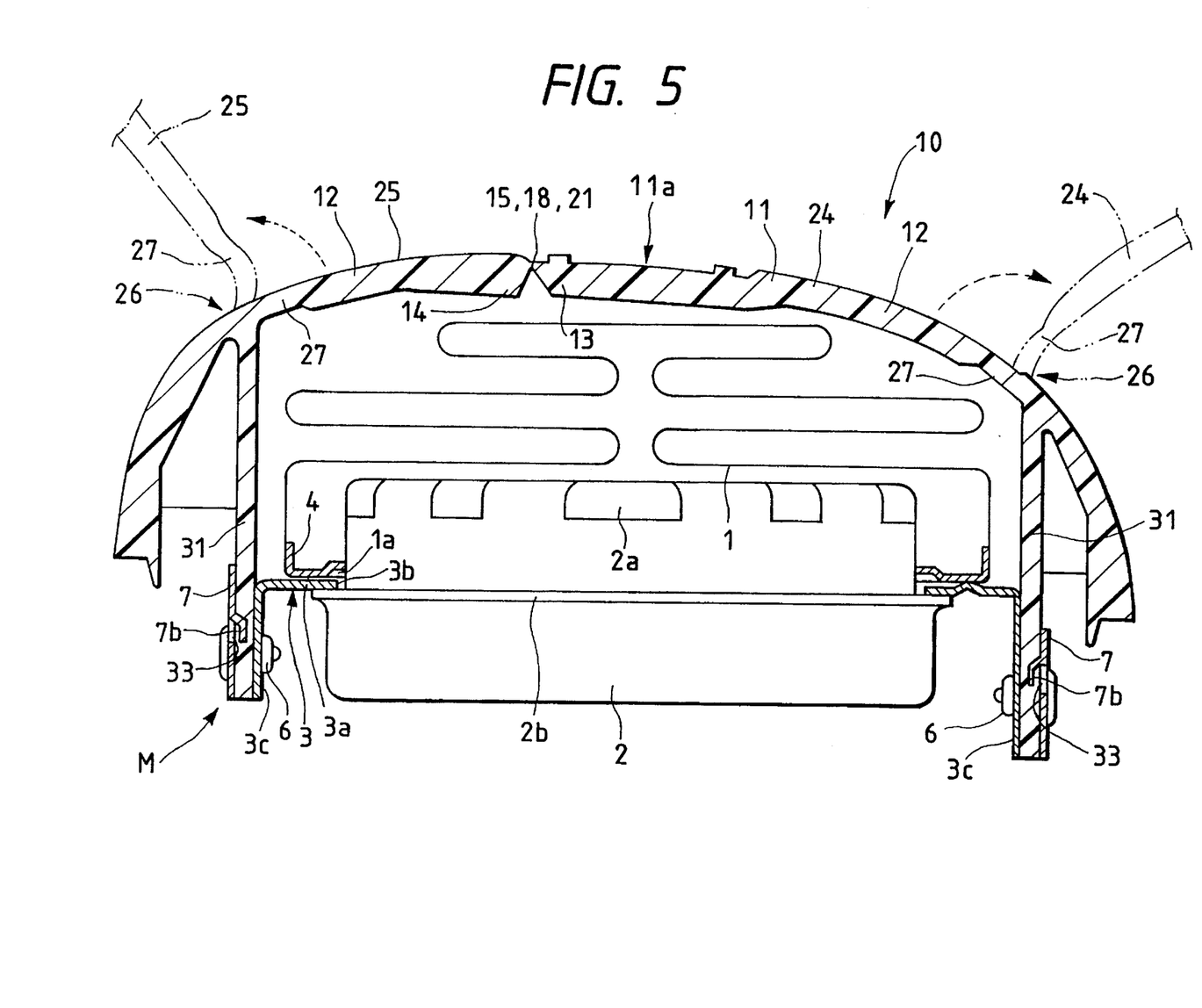
FIG. 5 is a cross-sectional view showing an open cover in phantom lines.

As shown in FIG. 5, a pad 10, which comprises an embodiment of the present invention, is adapted for use in an air bag device M that can be installed in a steering wheel.

The air bag device M includes: a folded air bag 1, an inflator 2 that supplies gas to the air bag 1, a pad or outer cover 10 that covers the periphery of the air bag 1, and a bag holder 3 that holds the air bag 1, the inflator 2, and pad 10.

Bag holder 3 is formed of a metal plate, and has a rectangular bottom wall 3a and four lateral walls 3c that extend downward from the four sides of the bottom wall 3a. The lateral walls 3c are connected to pad 10. An insertion hole 3b, in which the inflator 2 is inserted, is formed in bottom wall 3a.

The inflator 2 has a gas emission opening 2a and a flange portion 2b secured to the peripheral edge of the insertion hole 3b by a retainer 4.

The air bag 1 is secured to the peripheral edge of the insertion hole 3b opening 1a by securely fastening an air bag to retainer 4.

The retainer 4 includes plurality of bolts (not shown), which secure the air bag 1 and the inflator 2 to the bag holder 3 when these bolts are tightened. Such bolts can be inserted through the peripheral edge of opening 1a through the peripheral edge of the insertion hole 3b and through the flange portion 2b.

As shown in FIGS. 1 to 5, the pad or cover 10 has a top or outer wall 11, lateral walls 31 in the form of a substantially squared cylinder that extend downwardly from the rear surface of the outer wall 11. Pad or cover 10 is preferably formed by injection molding techniques using either styrene-containing thermoplastic elastomer (SEBS), olefin-containing thermoplastic elastomer (TPO), or ester-containing thermoplastic elastomer (TPEE), to which hydrogen is added and whose bending elastic modulus ranges from about 100 to about 4000 kg/cm$^2$.

When the bending elastic modulus exceeds 4000 kg/cm², the pad 10 loses its soft touch. However, when the bending elastic modulus is smaller than 100 kg/cm², the pad 10 cannot ensure proper tensile strength, thus making it likely that a portion other than a portion 15, which is supposed to break (hereinafter referred to as "the breaking portion 15"), will break when the air bag 1 expands. The breaking portion 15 will be described later.

A product, "TOUGHTECH C2891", manufactured by Asahi Chemical Industry, Co., Ltd. may be referenced as SEBS; a product, "SAMORAN", manufactured by Mitsubishi Petrochemical Co., Ltd. may be referenced as TPO, and a product, "LOMOD NBE063", manufactured by General Electric may be referenced as the TPEE.

SEBS materials preferably have a bending elastic modulus ranging from about 200 to 1300 kg/cm². When such modulus exceeds 1300 kg/cm² pad 10 loses its soft touch at low temperatures. However, when the modulus is smaller than 200 kg/cm², the proper tensile strength at high temperatures of air bag 1 cannot be ensured.

TPO materials preferably have a bending elastic modulus ranging from about 400 to 1000 kg/cm². When that modulus exceeds 1300 kg/cm² pad 10 will also lose its soft touch at low temperatures. Also, when the modulus is smaller than 400 kg/cm² the proper tensile strength at high temperatures of air bag 1 cannot be ensured.

TPEE materials preferably have a bending elastic modulus ranging from about 1000 to 3500 kg/cm². When such modulus exceeds 3500 kg/cm² pad 10 loses its soft touch at low temperatures When such modulus is smaller than 1000 kg/cm², the proper tensile strength at high temperatures of air bag 1 cannot be ensured.

Figure 1:
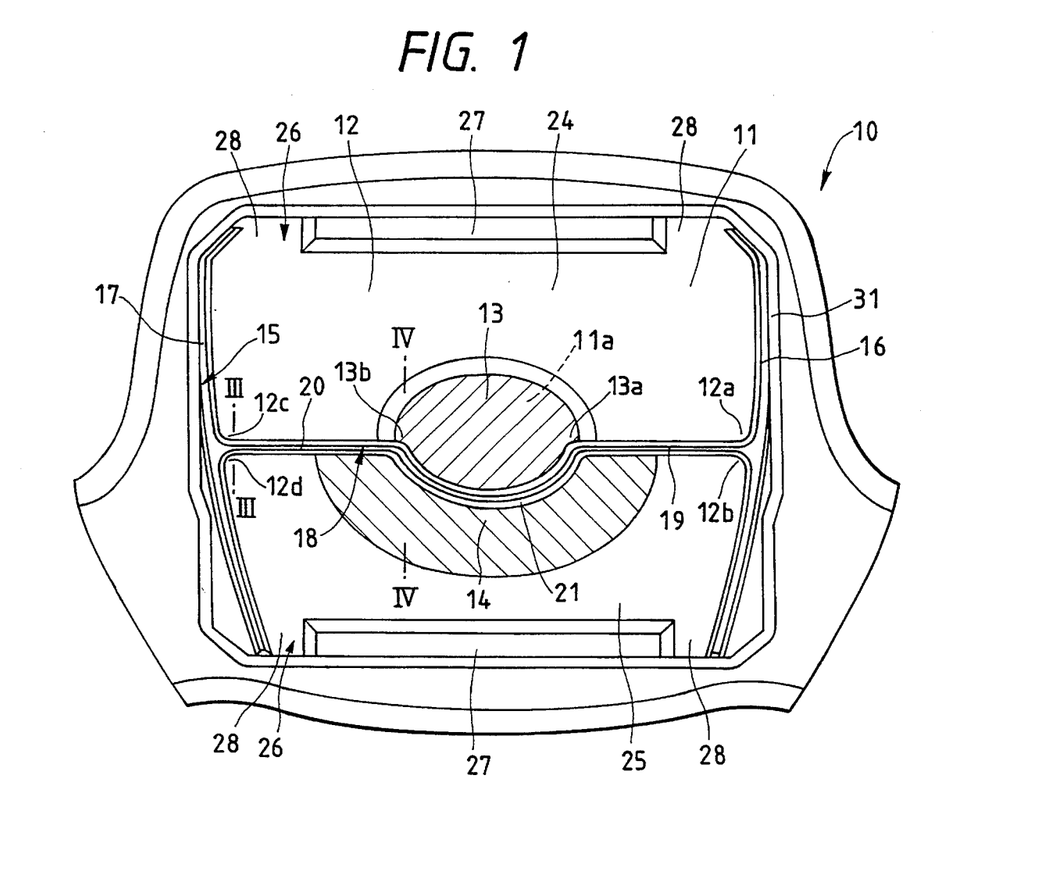
FIG. 1 is a bottom view of a pad according to the present invention.
Figure 2:
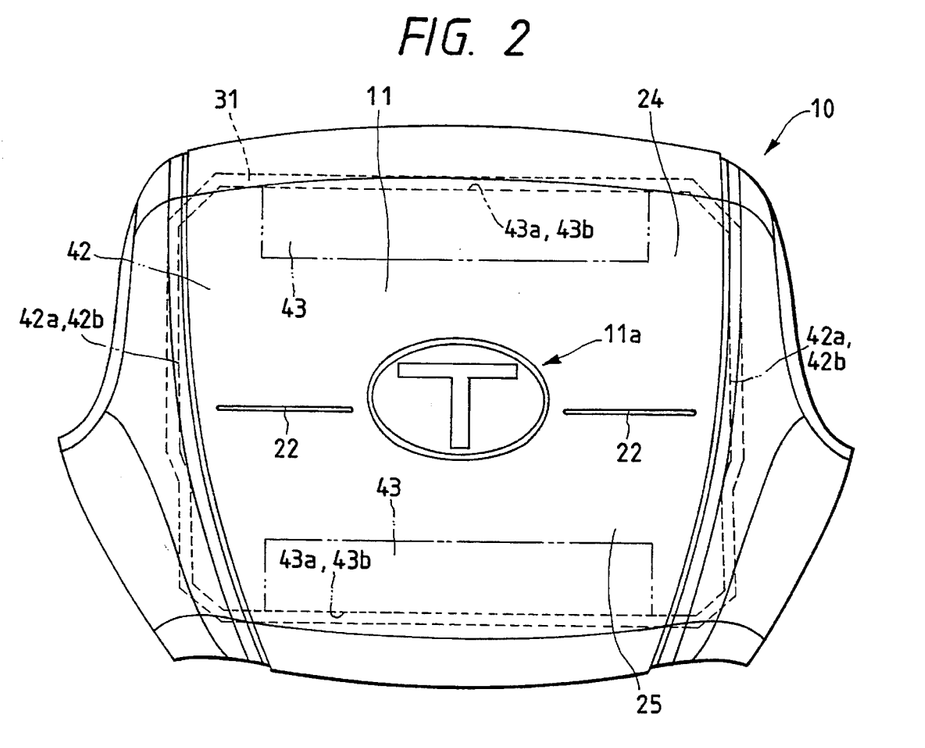
FIG. 2 is a top plan view thereof.

The outer wall 11 of pad 10 includes a breaking portion or seam 15 and an ordinary portion 12 that excludes the breaking portion 15 or comprises that portion of cover 10 lying outside the H-shaped breaking seam. Breaking portion 15 is a thin-walled portion that is designed to break when inflator 2 is actuated and air bag 1 expands. As shown in FIG. 1, breaking portion 15 is formed to have a substantially H-shape composed of vertical rod portions 16, 17 on both the left and right sides, as viewed in a vertical direction, and a horizontal seam portion 18 that connects the intermediate points of the vertical rod portions 16, 17, respectively. It is this substantially H-shaped breaking portion 15 that allows the outer wall 11 to open as would a pair of French doors at the time the air bag 1 expands; i.e., door portions 24, 25, which are surrounded by the breaking portion 15, open on hinges of normal thickness pad present between the ends of vertical rod portions 16 and 17 adjacent both the top and bottom edges of pad 10.

As seen in FIG. 1, the horizontal seam portion 18 in the breaking portion 15 includes straight line seam portions 19 and 20, as well as a U-shaped seam portion 21 interposed between these straight line portions 19 and 20. The U-shaped seam portion 21 extends along or about a decorative mark 11a positioned in the middle of the front surface of the outer wall 11. Grooves 22 can also be formed in the outer surface adjacent the respective straight line portions 19 and 20. Such grooves 22 improve the decorative effects on the front surface of the horizontal rod portion 18, and the thickness of each groove 22 is equal to the thickness of each of the straight line portions 19 and 20 which bulge downward and have no such grooves 22.

Figure 3:
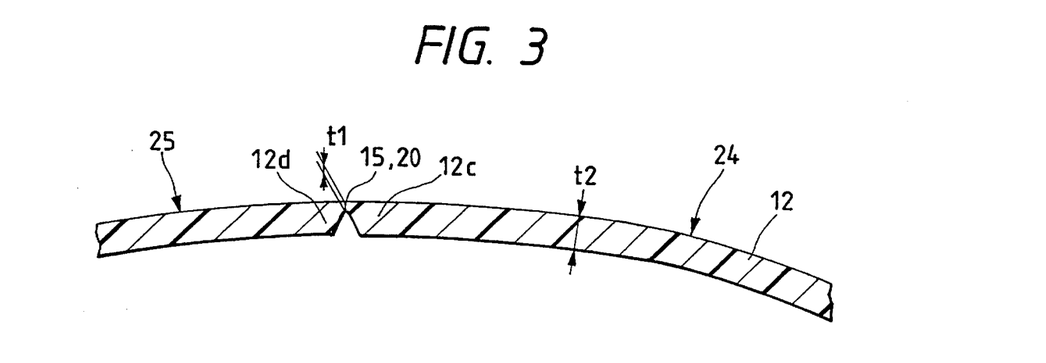
FIG. 3 is a cross-sectional view taken along line III—III of FIG. 1.

It should be noted that in this embodiment the thickness t1, as shown in FIG. 3, of the breaking portion 15 is set to about 0.8 mm with the thickness t2 of the ordinary portion 12 being about 5 mm excluding parts of thick-walled portions 13, 14 and hinge portions 26, which will be described later.

Figure 4:
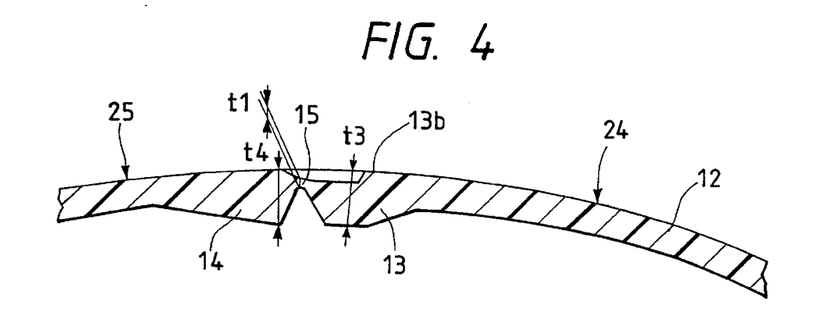
FIG. 4 is a cross-sectional view taken along line IV—IV of FIG. 1.

As shown in FIGS. 1, 4 and 5, the pad 10 has a thickness t4 for an area 14 of the ordinary portion 12, adjacent the outer peripheral side of the U-shaped portion 21 (indicated by slanted lines or shading extending downward to the right in FIG. 1) is thicker than the thickness of other areas of the ordinary portions, such as at 12a, 12b, 12c, 12d, as shown in FIG. 3, which areas are in the vicinities of the respective intersections between the vertical seam portions 16 and 17 and the straight line seam portions 19 and 20.

Further, the thickness t3 of ordinary portions 13a, 13b, shown in FIGS. 1 and 4, at the outer peripheral side of the intersections between the U-shaped seam portion 21 and the straight line seam portions 19 and 20 is thicker than the thickness t2 of the ordinary portions 12a, 12b, 12c, 12d in the vicinity of the respective intersections between the vertical seam portions 16 and 17 and the straight line portions 19 and 20.

It should be noted that thick-walled portions 13a, 13b of the ordinary portion 11, in the vicinity of the U-shaped portion 21, are formed as a part of the thick-walled portion 13, as indicated by shading in FIG. 1. Portion 13 projects moderately from the rear surface of the decorative mark 11a so as to exhibit a continuously thick-walled area. The thick-walled portion 13 that is located in the decorative mark 11a is such that not only the front surface of the decorative mark 11a is ellipsoidally recessed, but also a decorative character in the middle is similarly recessed. While the ellipsoidal recess and the recess of the decorative character portion are 1 mm deep, such thick-walled portion 13 is thicker than the rest of the ordinary portion 12 even if the ellipsoidal recess and the decorative character portion are included. The thickness t3 of the thick-walled portion 13 excluding the decorative character portion and the like is set to be about 6.5 mm. Further, the thickness t4 of the thick-walled portion 14 is set to about 6.5 mm.

Still further, in this embodiment the thickness of the vertical seam portions 16 and 17 of the breaking portion 15 is formed so as to become gradually thicker toward both ends, with the thickness varying from about 0.8 to about 2.0 mm, respectively, lest breakage should go beyond the vertical seam portions 16 and 17 when air bag 1 expands.

Also, the portions connecting both ends of the vertical seam portions 16 and 17 of the breaking portion 15 serve as the hinge portions 26 for portions 24 and 25 which opens like a door. These hinge portions 26 have horizontally extending thin-walled portions 27 whose thickness is set to be about 3.5 mm. The reason why such thin-walled portions 27 are formed is to allow the door portions 24 and 25 to be opened smoothly in association with the expansion of the air bag 1 by permitting the hinge portions 26 to flex satisfactorily when the pad 10 is placed at low ambient temperatures. In addition, the reason why the thickness of the thinned portion 27 is not made thin is to prevent the hinge portion 26 from breaking even if the pad 10 is placed at high ambient temperature by forming thick-walled portions 28 whose thickness is equal to that of the ordinary portion 12 that is thicker than the thin-walled portion 27 in the hinge portion 26.

Figure 6:
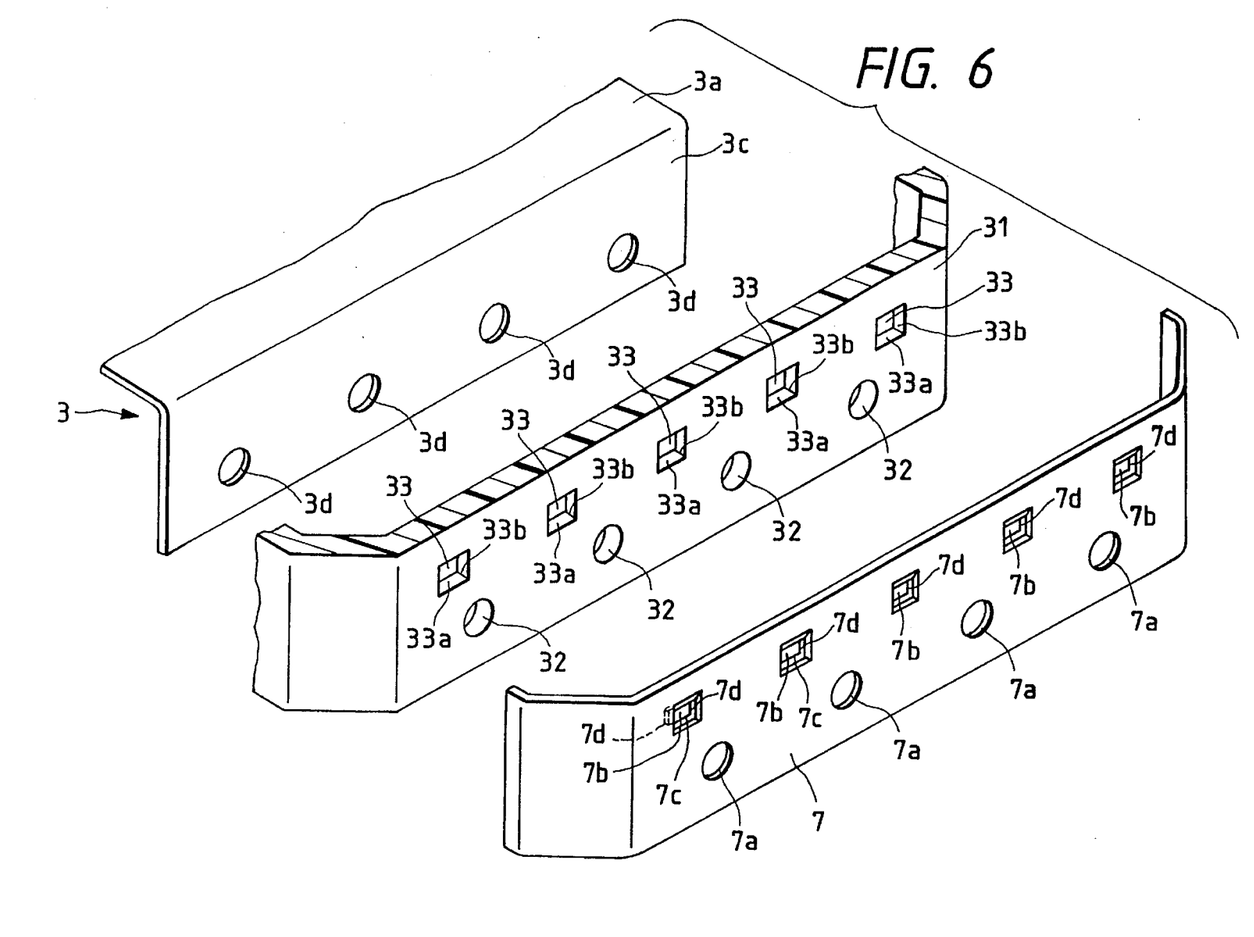
FIG. 6 is an exploded perspective view showing a structure for mounting a lateral wall of the embodiment onto a lateral wall of a bag holder.

As shown in FIGS. 5 and 6, insertion holes 32 are formed at predetermined positions in each of the lateral walls 31 of the pad 10 so that rivets 6 can be inserted thereinto in order to mount the corresponding lateral walls 31 onto the lateral walls 3c of the bag holder 3.

To mount each lateral wall 31 onto the corresponding lateral wall 3c of the bag holder 3, a strap 7 is used and arranged on an outer surface of the lateral wall 31. Recesses 33, for allowing a plurality of catches 7b formed on the strap 7 to be respectively retained therein, are also formed in the lateral wall 31. Catches 7b are formed partially and at intervals in the bag holder 3 and the recesses 33 are formed in each lateral wall 31 so as to correspond to the respective catches 7b to provide a very secure connection therebetween. This allows the structure to resist the application of a force such as to cause each lateral wall 31 to come off upward from between the strap 7 and the corresponding lateral wall 3c of the bag holder 3. Under such circumstances, the construction including a plurality of catches 7b, arranged at intervals with two lower corner portions 7d of each catch 7b being retained by two lower corner portions 33b of the corresponding recess 33, is more advantageous in improving the retaining force in a compact form. Such structure also increases the fastening force of each lateral wall 31 on the pad side with respect to the corresponding lateral wall 3c on the bag holder side. Such a construction provides these advantages over use of a single catch 7b whose width is as large as three of the catches 7b in the embodiment shown in FIG. 6, in which case the lower surface 7c would be similarly increased and retained by a lower surface 33a of the recess 33 whose width would likewise be increased to correspond to the size of the catch 7b. That is, since it is the corner portions 7d, not the wide lower surface 7c, that contributes more to improving the retaining force of the respective catches 7b with respect to the lateral wall 31 on the pad side, it is more effective to increase the number of corner portions 7d to improve the fastening force of the lateral wall 31 on the pad side with respect to the lateral wall 3c on the bag holder side.

It should be noted that reference character 3d denotes an insertion hole in the lateral wall 3c on the bag holder side for allowing the rivet 6 to be inserted thereinto; and that reference character 7a is an insertion hole in strap 7 for allowing rivet 6 to pass therethrough.

Figure 9:
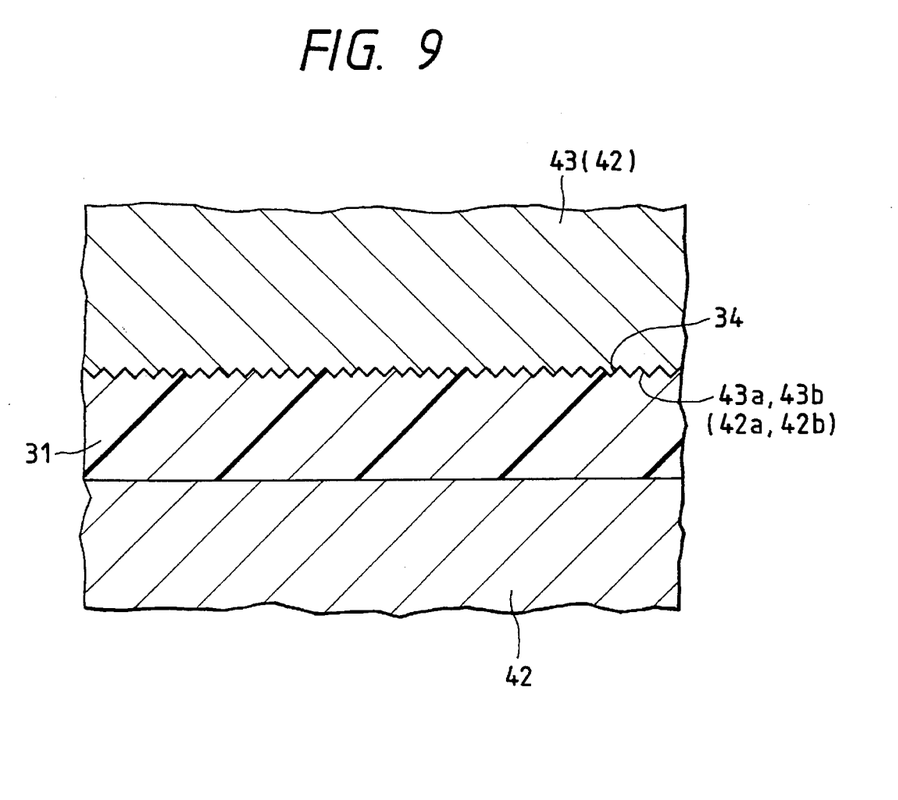
FIG. 9 is a horizontal cross-sectional view showing the lateral wall at the time of molding.

Further, as shown in FIG. 9, a great number of tiny saw teeth 34, whose depths range from about 1 to 50 μm, are formed on an inner peripheral surface of each lateral wall 31. These teeth 34 are formed so as to facilitate the lateral walls 31 to be separated from a mold after the pad 10, made of soft thermoplastic elastomer, has been molded.

Figure 7:
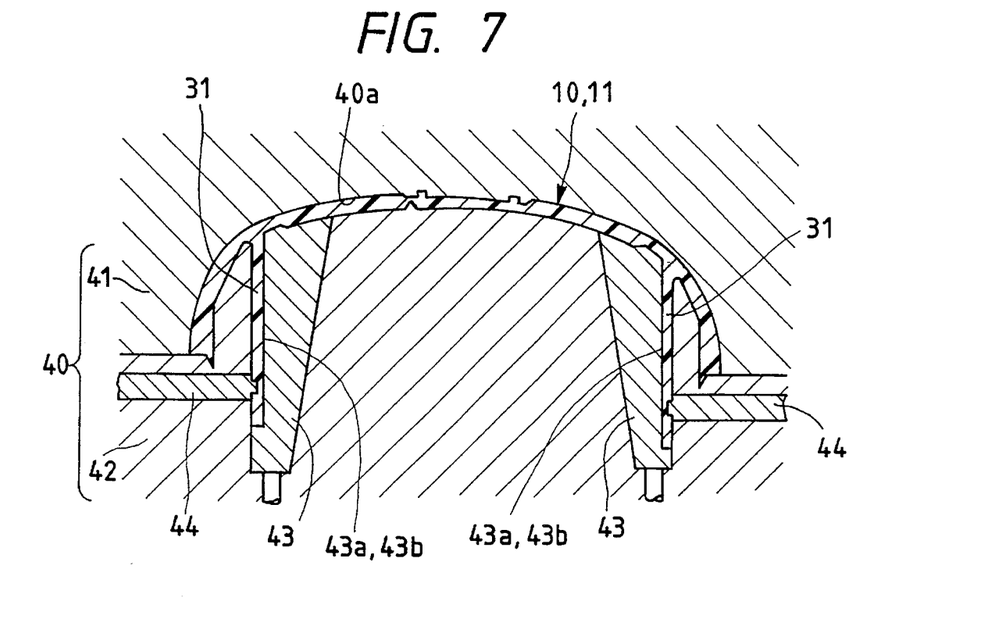
FIG. 7 is a cross-sectional view at the time of molding.
Figure 8:
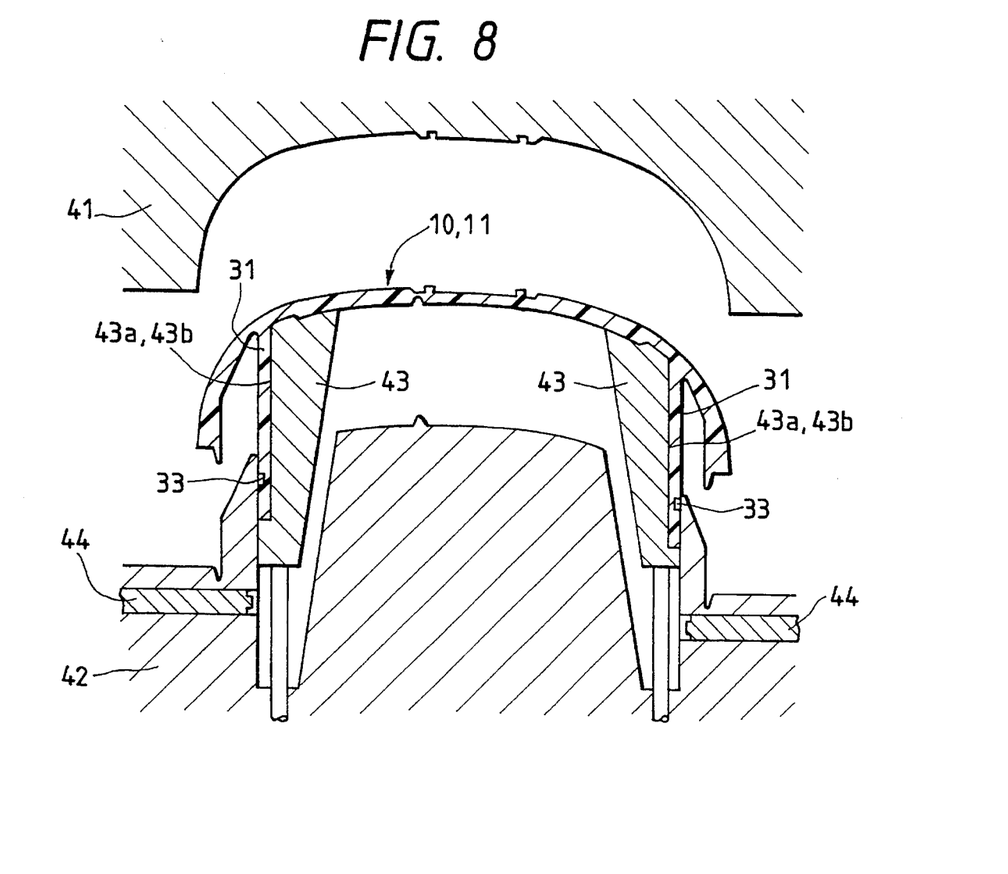
FIG. 8 is a cross-sectional view following molding.

Pad 10 is molded using an injection mold 40 having a fixed mold 41 and a moving mold 42 such as shown in FIGS. 7 and 8. Reference numeral 43 denotes an extruding core (see FIG. 2); and 44, a slide pin for molding portions such as the insertion holes 32 and the recesses 33 in the lateral walls 31 on the pad side.

A great number of saw teeth 42b, 43b are formed on mold surfaces 42a, 43a of both the moving mold 42 and the extruding core 43 for molding the inner peripheral surfaces of the lateral walls 31 on the pad side.

The method of molding the pad 10 using the mold 40 involves the steps of: charging a molding material into a closed cavity 40a as shown in FIG. 7; thereafter separating the moving mold 42 from the fixed mold 41 as shown in FIG. 8 so that not only the extruding core 43 are pushed out of the moving mold 42, but also the slide pins 44 are withdrawn.

At that time, the presence of the tiny saw teeth on the surface 42a of the moving mold 42, which allows air to stay in the asperities 42b slightly, causes the lateral walls 31 on both left and right sides of the pad 10 to be separated from the surface 42a without adhering to the surface 42a and therefore without breaking the lateral walls 31 on both left and right sides.

Further, to separate the pad 10 from the extruding core 43, the presence of the tiny saw teeth 43b on the surface 43a of the extruding core 43, which allows air to stay in the asperities 43b slightly, causes the lateral walls 31 on both front and rear sides of the pad 10 to be separated from the surface 43a without adhering to the surface 43a and therefore without breaking the lateral walls 31 on both front and rear sides.

During use, even if the air bag 1 is expanded to cause seam breakage to start at the middle of the U-shaped portion 21 and then extend toward the straight line portions 19 and 20 on both left an right sides of the horizontal seam portion 18 in the breaking portion 15, the seam breakage will be controlled. The thickness t4 of the area 14 of ordinary portion t2 on the outer peripheral side of the U-shaped portion 21 being thicker than the thickness t2 of the ordinary portions 12a, 12b, 12c, 12d in the vicinity of the intersections between the vertical seam portions 16 and 17 and the straight line seam portions 19 and 20, the thick-walled portion 14 on the outer peripheral side of the U-shaped seam portion 21 serves as a wall for blocking straight directions along which breakage could move. Therefore, seam breakage continues smoothly from the middle of the U-shaped seam portion 21 toward the straight lines 19 and 20 on both left and right sides along the curved profile of the U-shaped seam portion 21, thus allowing the breaking portion to break neatly.

Still further, the corner portions of the two doors 24 and 25 that open on hinges 26 while interposing the horizontal seam portion 18 therebetween at the time the air bag 1 expands, i.e., the ordinary portions 12a, 12b, 12c, 12d in the vicinity of the intersections between the vertical seam portions 16 and 17 and the straight lines 19 and 20 in the breaking portion 15, are not molded in a thick-walled manner. Therefore, impairment of soft touch of the pad is prevented.

Still further, even if seam breakage starts in the straight lines portions 19 and 20 and then extends toward the U-shaped seam portion 21 of the horizontal seam portion 18 in the breaking portion 15 of the pad 10, the thickness t3 of the ordinary portions 13a, 13b on the outer peripheral side in the vicinity of the intersections between the U-shaped seam portion 21 and the straight line portions 19 and 20 is thicker than thickness t2 of the ordinary portions 12a, 12b, 12c, 12d in the vicinity of the intersections between the vertical seam portions 16 and 17 and the straight line portions 19 and 20. Therefore, the thick-walled portions 13a, 13b serve as walls for blocking a straight direction along which breakage might follow. Therefore, seam breakage continues smoothly from the straight lines 19 and 20 toward the U-shaped seam portion 21, thus allowing the breaking portion to break neatly.

Still further, the pad 10 is made of thermoplastic elastomer whose elastic bending modulus is set to about 4000 $kg/cm^2$ or less. Therefore, the pad is soft, and satisfactory touch at the corner portions 12a, 12b, 12c, 12d yet proper breakage is still ensured. In addition, the elastic bending modulus is set to be about 100 $kg/cm^2$ or more. Therefore, such a tensile strength prevents breakage at portions other than the breaking portion 15, which in turn contributes to making the pad 10 suitable for covering an air bag 1 of the air bag device M.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A pad for covering an air bag device, comprising:

an outer wall covering a folded air bag, said outer wall having a substantially H-shaped thin-walled seam portion formed therein to break when the air bag expands and an ordinary portion located beyond said thin-walled seam portion;

said H-shaped thin-walled seam portion including a horizontally extending seam portion and two vertically extending seam portions positioned on opposite sides of said horizontal seam portion, said horizontal seam portion including two straight line seam portions, each respectively connected to one of said two vertical seam portions on the left and right sides of said substantially H shaped portion, said horizontal seam portion further including a curved U-shaped seam portion interposed between said straight line seam portions;

said ordinary portion having a thickness adjacent each side of said U-shaped seam portion that is thicker than a thickness of said ordinary portion adjacent the intersections between said vertical seam portions and said straight line seam portions.

2. A pad for an air bag device according to claim 1, wherein the thickness of said ordinary portion adjacent the intersection between said U-shaped seam portion and said straight line seam portions is thicker than the thickness of said ordinary portion in the vicinity of the intersections between said vertical seam portions and said straight line seam portions.

3. A pad for an air bag device according to claim 1, wherein said pad is of a single layered structure made of a thermoplastic elastomer which has an elastic bending modulus ranging from about 100 to about 4000 kg/cm$^2$.

4. A pad for an air bag device according to claim 1, further comprising hinge portions defined in the ordinary portion extending between each of the ends of said two vertical seam portions;

said hinge portions further including a portion having a thin-walled portion.

5. A pad for an air bag device according to claim 1, further comprising:

a plurality of downwardly depending lateral walls about the periphery of said pad, said lateral walls including a plurality of tiny saw teeth projections formed on an inner peripheral surface of said lateral walls.

6. An air bag device comprising:

a frame, a folded air bag mounted to said frame, an inflator connected to said frame that supplies gas to inflate said air bag, a cover formed of a single-layered structure made of a thermoplastic elastomer, said cover including an outer wall having a substantially H-shaped thin-walled seam portion formed therein and an ordinary portion extending therearound, said H-shaped thin-walled seam portion including a horizontally extending seam portion including two spaced apart straight line seam portions respectively connected to two vertical seam portions forming left and right sides of said substantially H-shaped seam portion and a curved U-shaped seam portion interposed between said straight line seam portions;

wherein the thickness of said ordinary portion adjacent said U-shaped seam portion is thicker than the thickness of said ordinary portion adjacent the intersection between said vertical seam portions and said straight line seam portions.

7. An air bag device according to claim 6, wherein the thickness of said ordinary portion adjacent the intersection between said U-shaped seam portion and said straight line seam portions is thicker than the thickness of said ordinary potion in the vicinity of the intersections between said vertical seam portions and said straight line seam portions.

8. An air bag device according to claim 6, wherein said thermoplastic elastomer has an elastic bending modulus ranging from about 100 to about 4000 kg/cm$^2$.

9. An air bag device according to claim 6, further comprising hinge portions defined in the ordinary portion extending between each of the ends of said vertical seam portions;

wherein said hinge portions have thin-walled portions.

10. An air bag device according to claim 6, further comprising:

a plurality of downwardly depending lateral walls about the periphery of said pad, said lateral walls including a plurality of tiny saw teeth projections formed on an inner peripheral surface of said lateral walls of said pad.

11. An air bag device according to claim 10, wherein said frame is formed of a metal plate having a rectangular bottom wall and four lateral walls that extend downwardly from each of four sides of said bottom wall, each of said lateral walls having said pad mounted thereto, said bottom wall further including an insertion hole for receiving said inflator therein.

12. An air bag device according to claim 11, further including a strap arranged on an outer surface of each of said plurality of lateral walls of said pad to mount each lateral wall of said pad onto a corresponding one of said lateral walls of said frame.

13. An air bag device according to claim 12, further including a plurality of spaced apart catches formed along said strap.

14. An air bag device according to claim 13, further including a plurality of spaced apart recesses formed in said lateral walls of said pad for allowing said plurality catches to be respectively retained therein.

* * * * *